(12) United States Patent
Faulkner

(10) Patent No.: US 7,071,703 B2
(45) Date of Patent: Jul. 4, 2006

(54) TECHNIQUE FOR ESTIMATION OF A SUBSCRIBER LINE INSERTION LOSS

(75) Inventor: Roger Faulkner, Swindon (GB)

(73) Assignee: Teradyne, Inc., Boston, MA (US)

( * ) Notice: Subject to any disclaimer, the term of this patent is extended or adjusted under 35 U.S.C. 154(b) by 22 days.

(21) Appl. No.: 11/005,055

(22) Filed: Dec. 6, 2004

(65) Prior Publication Data

US 2005/0094785 A1    May 5, 2005

Related U.S. Application Data

(62) Division of application No. 10/220,716, filed as application No. PCT/GB01/00936 on Mar. 5, 2001, now Pat. No. 6,894,504.

(30) Foreign Application Priority Data

Mar. 3, 2000    (GB)    .................................. 005227.4

(51) Int. Cl.
*H01H 31/04*    (2006.01)
*G01R 19/00*    (2006.01)
(52) U.S. Cl. .................. 324/539; 324/538; 379/399.01; 370/252
(58) Field of Classification Search ................ 324/520, 324/521, 527, 537, 539, 616, 76.11, 76.12; 379/399.01, 1.01, 23, 24, 29.05, 30
See application file for complete search history.

(56) References Cited

U.S. PATENT DOCUMENTS

| | | |
|---|---|---|
| 3,882,287 A | 5/1975 | Simmonds |
| 4,087,657 A | 5/1978 | Peoples |
| 4,186,283 A | 1/1980 | Simmonds |
| 4,529,847 A | 7/1985 | DeBalko |
| 4,620,069 A | 10/1986 | Godwin et al. |
| 4,868,506 A | 9/1989 | DiStefano |
| 5,025,221 A | 6/1991 | Blaess |
| 5,083,086 A | 1/1992 | Steiner |
| 5,121,420 A | 6/1992 | Marr et al. |
| 5,128,619 A | 7/1992 | Bjork et al. |
| 5,157,336 A | 10/1992 | Crick |
| 5,270,661 A | 12/1993 | Burnett |
| 5,302,905 A | 4/1994 | Crick |
| 5,319,311 A | 6/1994 | Kawashima et al. |
| 5,400,321 A | 3/1995 | Nagato |
| 5,402,073 A | 3/1995 | Ross |
| 5,404,388 A | 4/1995 | Eu |
| 5,436,953 A | 7/1995 | Nilson |

(Continued)

FOREIGN PATENT DOCUMENTS

EP    0722164 A1    7/1996

(Continued)

OTHER PUBLICATIONS

Backer, et al., "Telephone Access Network Measurements," 1998, Tektronix XP002148949.

(Continued)

*Primary Examiner*—Vincent Q. Nguyen

(57) ABSTRACT

A method and apparatus for pre-qualifying lines with respect to estimating the insertion loss of the line is presented. End-to-end insertion loss at high frequencies is estimated from measurements made at low frequencies through the voice switch at the central office of a telephone company. An AC voltage waveform is applied to the telephone line being tested. Real and imaginary components of the resultant waveform are measured. These measurements are captured and used to estimate the insertion loss of the telephone line at frequencies in the range of 40 kHz to 300 kHz.

7 Claims, 2 Drawing Sheets

U.S. PATENT DOCUMENTS

| | | | |
|---|---|---|---|
| 5,461,318 A | 10/1995 | Borchert et al. |
| 5,465,287 A | 11/1995 | Egozi |
| 5,528,661 A | 6/1996 | Siu et al. |
| 5,528,679 A | 6/1996 | Taarud |
| 5,606,592 A | 2/1997 | Galloway et al. |
| 5,629,628 A | 5/1997 | Hinds et al. |
| 5,636,202 A | 6/1997 | Garney |
| 5,680,391 A | 10/1997 | Barron et al. |
| 5,699,402 A | 12/1997 | Bauer et al. |
| 5,758,027 A | 5/1998 | Meyers et al. |
| 5,790,523 A | 8/1998 | Ritchie, Jr. et al. |
| 5,864,602 A | 1/1999 | Needle |
| 5,870,451 A | 2/1999 | Winkler et al. |
| 5,881,130 A | 3/1999 | Zhang |
| 5,937,033 A | 8/1999 | Bellows |
| 5,956,386 A | 9/1999 | Miller |
| 5,978,449 A | 11/1999 | Needle |
| 6,002,671 A | 12/1999 | Kahkoska et al. |
| 6,014,425 A | 1/2000 | Bingel et al. |
| 6,026,145 A | 2/2000 | Bauer et al. |
| 6,084,946 A | 7/2000 | Beierle |
| 6,091,338 A | 7/2000 | Natra |
| 6,091,713 A | 7/2000 | Lechleider et al. |
| 6,107,867 A | 8/2000 | Lakshmikumar |
| 6,111,861 A | 8/2000 | Burgess |
| 6,115,466 A | 9/2000 | Bella |
| 6,118,860 A | 9/2000 | Hillson et al. |
| 6,154,447 A | 11/2000 | Vedder |
| 6,169,785 B1 | 1/2001 | Okazaki |
| 6,177,801 B1 | 1/2001 | Chong et al. |
| 6,181,775 B1 | 1/2001 | Bella |
| 6,192,109 B1 | 2/2001 | Amrany et al. |
| 6,205,202 B1 | 3/2001 | Yoshida et al. |
| 6,209,108 B1 | 3/2001 | Pett et al. |
| 6,215,854 B1 | 4/2001 | Walance |
| 6,215,855 B1 | 4/2001 | Schneider |
| 6,226,356 B1 | 5/2001 | Brown |
| 6,240,177 B1 | 5/2001 | Guntzburger et al. |
| 6,256,377 B1 | 7/2001 | Murphree et al. |
| 6,263,047 B1 | 7/2001 | Randle et al. |
| 6,263,048 B1 | 7/2001 | Nelson et al. |
| 6,266,395 B1 | 7/2001 | Liu et al. |
| 6,285,653 B1 | 9/2001 | Koeman et al. |
| 6,292,468 B1 | 9/2001 | Sanderson |
| 6,292,539 B1 | 9/2001 | Eichen et al. |
| 6,349,130 B1 | 2/2002 | Posthuma et al. |
| 6,366,644 B1 | 2/2002 | Sisk et al. |
| 6,385,297 B1 | 5/2002 | Faulkner et al. |
| 6,389,109 B1 | 5/2002 | Schmidt et al. |
| 6,445,733 B1 | 9/2002 | Zuranski et al. |
| 6,456,694 B1 | 9/2002 | Posthuma |
| 6,463,126 B1 | 10/2002 | Manica et al. |
| 6,466,647 B1 | 10/2002 | Tennyson |
| 6,487,276 B1 | 11/2002 | Rosen et al. |
| 6,507,870 B1 | 1/2003 | Yokell et al. |
| 6,614,880 B1 | 9/2003 | Lysaght et al. |
| 6,687,336 B1 | 2/2004 | Holeva |
| 6,741,676 B1 | 5/2004 | Rudinsky et al. |
| 6,781,386 B1 | 8/2004 | Le Henaff |
| 2002/0089999 A1 | 7/2002 | Binde |
| 2003/0048756 A1 | 3/2003 | Chang et al. |

FOREIGN PATENT DOCUMENTS

| | | |
|---|---|---|
| WO | WO 91/11872 | 8/1991 |
| WO | WO 98/44428 A1 | 10/1998 |
| WO | WO 99/63427 A1 | 12/1999 |
| WO | WO 00/27134 | 5/2000 |
| WO | WO 00/64132 | 10/2000 |
| WO | WO 01/01597 A1 | 1/2001 |
| WO | WO 01/24490 | 4/2001 |
| WO | WO 01/67729 A1 | 9/2001 |

OTHER PUBLICATIONS

Boets, et al. "The Modelling Aspect of Transmission Line Networks," May 12, 1992, pp. 137-141.

Chiu et al. "Loop Survey in the Taiwan Area and Feasibility Study for HDSL," IEEE, vol. 9, No. 6, Aug. 1991, pp. 801-809.

Eichen, et al., "DSTS: An Expert System for Diagnosis of Advanced Digital Subscriber Services," IEEE Network Operations and Management Symposium, U.S. NY, vol. Conf. 10, pp. 794-804.

Goralski, "xDSL Loop Qualification and Testing," IEEE Communications Magazine, May 1999.

Harris Communications, National Communications forum Presentation, Chicago, IL Oct. 5, 1998.

Harris White Paper, "Testing in the Unbundled Loop: The Challenge for ILECS and C:ECS". pp. 1-.

Hedlund, et al., DSL Loop Test Telephony, vol. 235, No. 8, Aug. 24, 1998.

Heikman Product Information Release, "Introducing Hekimian's Comprehensive ADSL Test Solution,".

IEEE Std 743-1995 "IEEE Standard Equipment Requirements and Measurement Techniques for Analog Transmission Parameters for Telecommunications" 1996.

"Loop Qualification, Prerequisite for Volume xDSL Deployment," The TeleChoice Report on xDSL, vol. 2, No. 3, Mar. 1997.

"Network and Customer Installation Interfaces—Asymmetric Digital Subscriber Line (ADSL) Metallic Interface," ANSI T10413-1998. Revision of ASSI T1. 413-1995 (Not Published).

Stewart, "Testing ADSL: The Easier the Better, America's Network," Dec. 15, 1998 pp. 24-27.

Turnstone Systems, Inc., Product Literature and Presentation at Turnstone Systems, Inc., Sep. 1992.

Roehrkasten, "Meassung Von SDSL=Parametern", Nachrichtentechnik Electronik, DE Veb Verlag Technik, Berlin, vol. 48, No. 2, Mar. 1, 1998, pp. 20-21.

Rye Senjen et al, "Hybrid Expert Systems for Monitoring and for Diagnosis", proceedings of the Conference on Artificial Intelligence for Applications, IEEE, Comp. Soc. Press. vol. Conf. 9, Mar. 1, 1993, pp. 235-241.

Woloszynski, "It's Here," Bellcore Exchange Magazine, Jun. 1998.

Zieman, "ADSL Line Qualification Tests," Online!, Wandel and Goltermann, http://www.wg.com/appnotes/adsltest.html.

TECHNIQUE FOR ESTIMATION OF A SUBSCRIBER LINE INSERTION LOSS

BACKGROUND OF THE INVENTION

This invention relates generally to communication networks and more particularly to systems for qualifying telephone lines for data transmission. As is known in the art, public switch telephone networks, i.e., so-called plain old telephone service (POTS) lines, were originally designed for voice communications, which cover a limited frequency bandwidth (i.e., about 4 KHz). Today, it is desired to use the same POTS lines for data transmission. Data signals, however, generally have different frequency characteristics than voice signals. As a result, a POTS line that works well transmitting voice signals might not work well, or at all, for data signals. Telephone companies need to know which lines are suitable, i.e., qualify, and which lines are not suitable for data transmission. Telephone companies also need to know why particular lines are unable to support data transmissions and where such faults occur so they can determine whether the transmission line can be corrected.

There are problems for telephone operating companies (TELCO's) attempting to qualify subscriber loops for delivery of data. One problem is strategic. Telco's are reluctant to deploy emerging technologies for the delivery of data (e.g., ISDN or ADSL) because there is uncertainty in their knowledge that sufficient of the subscriber loops are of high enough quality to make deployment economically successful. This discourages early adopters because there is significant risk in being first to deliver a technology that may not work in their access network. If Telco's could be given a technology to take much of this risk out of initial deployment, they can secure market share and lead in the face of competition An additional problem is tactical and comes after a Telco has made a decision to deploy a particular technology. There is a need to qualify, either pro-actively or reactively, specific lines for service as that service is requested by subscribers or targeted by the Telco for delivery. Line Qualification is the overall ability to make statements about the quality of a subscriber loop as it relates to its ability to deliver voice communications (i.e. POTS), or data services. Disqualification is the ability to make a statement with a high degree of confidence that a subscriber loop will not support a data service without remedial actions. Pre-qualification is the ability to make a statement with a high degree of confidence that a subscriber loop will support a data service without remedial actions before attempting to deploy such data services.

When a Telco is able to market and deliver the new service, they would like to target those subscriber loops most likely to support the service out of the box and/or with a minimum of work. As another example, a Telco receiving a new service request from a subscriber desires information to either accept or reject that request for new service based on the condition of the line associated with the subscriber.

A telephone company would like to pre-qualify a line for high data rate operation, such as ISDN and ADSL. Lines that have been pre-qualified can be leased at a higher price. Lines that fail the pre-qualified testing would not be made available for these high data rate services.

SUMMARY OF THE INVENTION

With the foregoing background in mind, it is an object of the present invention to provide a method and apparatus for pre-qualifying telephone lines with respect to estimating the insertion loss of the telephone line. End-to-end insertion loss at high frequencies is estimated from single-ended measurements made at low frequencies through the voice switch at the central office of the Telephone Company. An AC voltage waveform is applied to the telephone line being tested. Real and imaginary components of the resultant waveform are measured. These measurements are captured and used to estimate the insertion loss of the telephone line at frequencies in the range of 40 kHz to 300 kHz.

BRIEF DESCRIPTION OF THE DRAWINGS

The invention will be better understood by reference to the following more detailed description and accompanying drawings in which.

DESCRIPTION OF THE PREFERRED EMBODIMENT

The telephone network was originally designed for voice communication. Voice communication covers a limited frequency bandwidth. In some cases, telephone lines were optimized for signals within this frequency range (approximately 4 kHz). Even where the lines were not optimized for voice signals, there was no incentive to make the lines operate at other frequencies and often they did not. Now, it is desired to use those same lines to carry data signals. The data signals generally have different frequency characteristics than the voice signals. As a result, a line that works very well transmitting voice signals might not work well or at all for data signals. Phone companies need to know which lines will work for data signals and use those lines for data.

Figure 1:
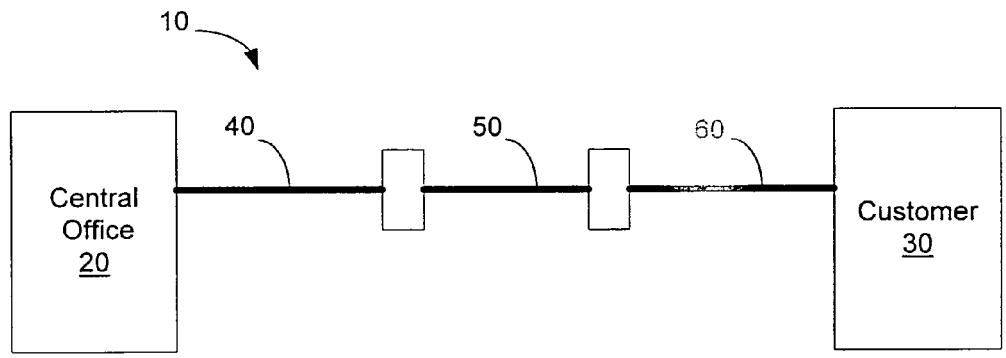
FIG. 1 is a block diagram of a prior art telephone system from a central office to a customer.

Referring to FIG. 1, a prior art portion of a telephone system 10 is shown. The system includes a telephone company central office 20 which has a line extending to a customer 30. The line 40 includes at least two wires, a tip wire ad a ring wire which are used to provide communication between the central office and the customer 30. The line may be comprised of multiple segments 40, 50 and 60. A first segment 40 may be of a particular gauge. A following segment 50 may be of a different gauge then the first segment 40. A third segment 60 may also be of a different gauge than first segment 40 and second segment 50.

There are a number of factors which decrease the end to end data rate attainable on a pair of wires of a telephone line. Some of these factors are imbalanced lines, contact faults and the like. Given that a telephone line has no other parasitic conditions, the operation of the service on the line ultimately depends on the overall attenuation or insertion loss of the wire pair to the signal applied. Currently telephone companies measure insertion loss by deploying personnel to either end of the wire pair to measure the insertion loss at different frequencies (e.g. 100 kHz, 300 kHz, etc.) through hand held instruments. This procedure is expensive, labor intensive, and time consuming.

Figure 2:
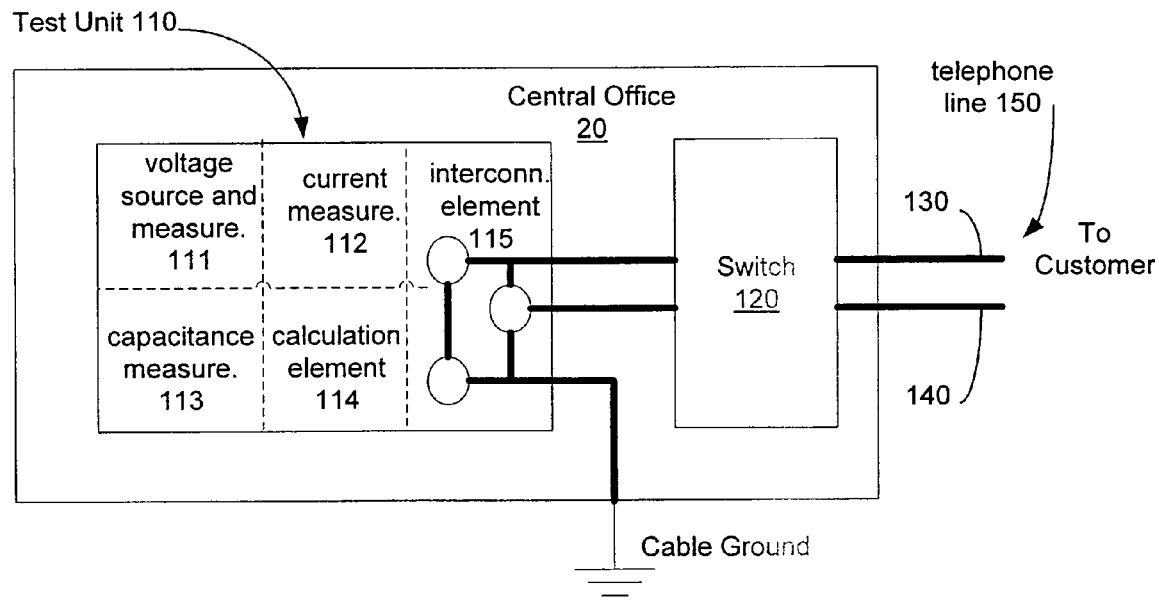
FIG. 2 is a block diagram of the remote measuring unit coupled to the switch test access of the central office.

Referring now to FIG. 2, a block diagram of the present invention 110 is shown coupled to a selected telephone line 150. In this embodiment a test unit 110 is located within the central office 20 of a telephone company. The test unit 110 includes an interconnection element 115, a voltage measurement element 111, a current measurement element 112, a capacitance measurement element 113 and a calculation element 114. The test unit 110 measures the wires 130 and 140 of a selected telephone line 150. The wires 130 and 140 are accessed through a voice switch 120. As such, the test unit 110 may access a plurality of telephone lines through the switch 120, thus providing measurements of several telephone lines quickly and easily. By utilizing the voice switch 120, the injected signals are limited to the voice band, that is up to about 4 kHz.

The test unit 110 comprises a hardware/software system specifically developed for estimating insertion loss of a telephone line. The software includes commands and data for directing the hardware to perform the various functions such as interconnecting the tip and ring wires of a telephone line, applying a voltage to a telephone line, measuring the capacitance of a telephone line, measuring the voltage of a telephone line, measuring the current in a telephone line, and calculating the estimated insertion loss of the telephone line. Other functions may also be provided. The test unit 110 also includes storage for storing the values of the measured variables as well as storing the commands and data associated with estimating the insertion loss of the selected telephone line.

By way of test unit 110, the wires 130 and 140 of the selected telephone line 150 are placed in electrical contact with each other by interconnect element 115. This is done to cancel any effects that may result from a customer terminating device on the selected telephone 150. The test unit 110 utilizes the capacitance measurement element 113 to perform a lumped capacitance measurement of the wires 130, 140 to ground. This lumped capacitance measurement is made at a low frequency, for example at approximately 1 kHz or less.

The test unit 110 applies a common mode AC voltage between the wires 130, 140 and ground. The test unit 110 utilizes the voltage measuring element to measure the AC voltage between the wires 130, 140 and ground. The current measuring element 112 is utilized to measure the driving AC current through the wires. The measured AC voltage is divided by the measured AC current to give the impedance Z.

Test unit 110 utilizes the calculation element 114 to estimate the insertion loss of the selected telephone line at a high frequency, for example 100 kHz, according to the formula:

$$\text{Insertion loss at 100 kHz} = \frac{5000}{\sqrt{(Z^2 + [1/\omega C]^2)}} \text{ dB}$$

Wherein Z is equal to the measured voltage divided by the measured current, C is equal to the measured capacitance, and ω is 2π times the driving frequency.

The above-described apparatus is useful for performing estimations of insertion loss of a telephone line at a high frequency. The estimation is accomplished by making low frequency single-ended measurements of the line. The measurements can be made at the central office of the Telephone Company and the measurements do not require knowledge of the physical characteristics of the telephone line being measured.

Figure 3:
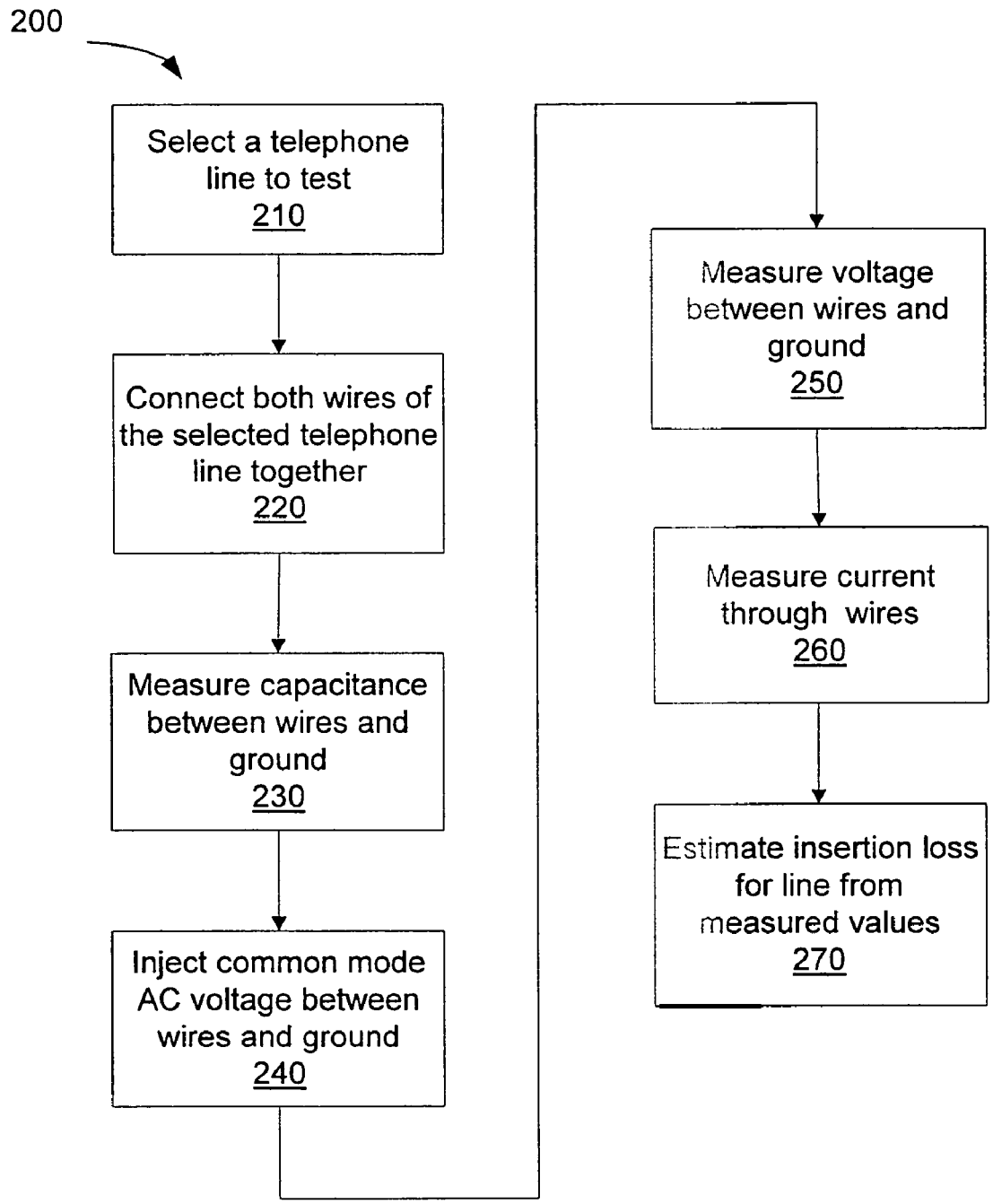
FIG. 3 is a flow chart of a method of measuring insertion loss of a telephone line.

Referring now to FIG. 3, a flowchart showing a method 200 of estimating the insertion loss of a subscriber line is shown. The first step 210 is to select a telephone line to measure. Typically the line is accessed through the voice switch at the central office of the Telephone Company.

The next step, 220, is to connect the tip and ring wires of the selected phone line to each other. This is done to cancel the effects of any terminating device on the selected telephone line.

The following step 230 measures the capacitance between the wires and ground. This measured capacitance value is stored for later use. The capacitance measurement is made at a low frequency such as 1 kHz or less. As such, the measurement can be made through the voice switch at the central office.

At step 240 a common mode AC voltage having a driving frequency of between approximately 2 kHz and approximately 6 kHz, and preferably less than approximately 5 kHz, is applied between the wires of the selected telephone wire and ground. Real and imaginary components of the resultant waveform will be measured, as described in the following steps.

At step 250 the resultant voltage between the wires and ground is measured and recorded. At step 260 the resultant current flow in the wires is measured and recorded.

At step 270 the insertion loss at a high frequency is estimated from the low frequency measurements. The insertion loss of the selected telephone line is calculated according to the formula:

$$\text{Insertion loss at 100 kHz} = \frac{5000}{\sqrt{(Z^2 + [1/\omega C]^2)}} \text{ dB}$$

Where Z is equal to the measured voltage divided by the measured current, C equal to the measured capacitance and ω is 2π times the driving frequency.

The above-described method provides for performing estimations of insertion loss of a telephone line at a high frequency. The estimation is accomplished by making low frequency single-ended measurements of the line. The measurements can be made at the central office of the Telephone Company and the measurements do not require knowledge of the physical characteristics of the telephone line being measured.

Having described preferred embodiments of the invention it will now become apparent to those of ordinary skill in the art that other embodiments incorporating these concepts may be used. Additionally, the software included as part of the tool may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer program product for a test unit, the computer program product comprising a computer usable medium having computer readable code thereon, including program code comprising:

instructions and data for causing a processor to perform at least one of interconnecting two wires of a phone line to each other, measuring a capacitance between said phone line and ground, applying an AC voltage between said phone line and ground, measuring a resulting voltage between said phone line and ground, measuring a current of said telephone line, and estimating an insertion loss of said phone line.

2. The computer program product of claim 1 wherein said instructions and data include commands for measuring a capacitance between the phone line and ground at a frequency of less than approximately 1 kHz.

3. The computer program product of claim 1 wherein said instructions and data include commands for applying an AC voltage having a frequency between approximately 2 kHz and approximately 6 kHz.

4. The computer program product of claim 1 wherein said instructions and data include commands for applying an AC having a frequency of less than approximately 5 kHz.

5. The computer program product of claim 1 wherein said instructions and data include commands for estimating an insertion loss of a telephone line between approximately 40 kHz and approximately 300 kHz.

6. The computer program product of claim 1 wherein said instructions and data include commands for estimating an insertion loss of a telephone line at approximately 100 kHz.

7. The computer program product of claim 1 wherein said instructions and data include commands for estimating an insertion loss of a telephone line according to the formula:

$$\frac{5000}{\sqrt{(Z^2 + [1/\omega C]^2)}} \text{ dB}$$

wherein Z is equal to said voltage divided by said current, C is equal to said capacitance and $\omega$ is a $2\pi$ times a driving frequency.

* * * * *